United States Patent

[11] 3,626,217

[72] Inventors Carl Peter Sandbank
Grailands, Bishop's Stortford;
John Stuart Heeks; Edward Albert Feuell,
both of Harlow, all of England

[21] Appl. No. 597,975
[22] Filed Nov. 30, 1966
[45] Patented Dec. 7, 1971
[73] Assignee International Standard Electric Corporation
New York, N.Y.
[32] Priority Jan. 14, 1966
[33] Great Britain
[31] 1,857/66

[54] SOLID-STATE CODERS
7 Claims, 11 Drawing Figs.

[52] U.S. Cl. .......... 307/299, 317/234 V, 331/107 G
[51] Int. Cl. .......... H01l 9/00
[50] Field of Search .......... 317/234 V; 307/107 G

[56] References Cited

UNITED STATES PATENTS

| | | | |
|---|---|---|---|
| 3,439,236 | 4/1969 | Blicher | 317/234 |
| 3,377,566 | 4/1968 | Lanza | 331/107 |
| 2,761,020 | 8/1956 | Shockley | 317/234 V |
| 3,365,583 | 1/1968 | Gunn | 317/234 V |

OTHER REFERENCES

Electronic Engineering, " A Gunn Effect Epitaxial Device for Microwave Applications" page 597, Sept. 1965, 317/234/10

Nerem Record, " Physics of the Gunn Effect and its Relevance to Devices," by McCumber, pages 76- 77, Nov. 1965, 317/234/10

The Radio and Electronic Engineer, " Some Aspects of Gunn Oscillators," by Robson et al., pages 345- 352, Dec. 1965, 331-107G

*Primary Examiner*—Jerry D. Craig
*Attorneys*—C. Cornell Remsen, Jr., Rayson P. Morris, Percy P. Lantzy, Philip M. Bolton and Isidore Togut

ABSTRACT: A solid-state device comprising a specimen of multivalley semiconductor material and electric field applying means connected to ohmic contacts attached at one surface of the specimen. The semiconductor material has the innate property of being responsive to electric fields in excess of a critical intensity to cause a redistribution of electric fields so as to nucleate a high electric field region, or domain, and responsive to electric fields in excess of a sustaining intensity, to propagate such high electric field region. A field-sustaining point whereat the electric field intensity is less than a sustaining intensity is defined along an intermediate portion of the specimen. High electric field regions are nucleated and propagated in cyclic fashion such that current through the specimen varies periodically in time in the form of coherent oscillations. The location of the field-sustaining point and, therefore, the frequency of the coherent oscillations in the specimen is continuously controlled by the voltage applied across the ohmic contacts.

Inventors
CARL P. SANDBANK
JOHN S. HEEKS
EDWARD A. FEUELL
By A. L. Lessler
Attorney Inventors
CARL P. SANDBANK
JOHN S. HEEKS
EDWARD A. FEUELL
By A. L. Lessler
Attorney

SOLID-STATE CODERS

The invention relates to semiconductor devices including semiconductive material exhibiting moving high field instability effects, and to apparatus embodying such devices.

If a crystal of one of certain semiconductive materials is subjected to a steady electric field exceeding a critical value the resultant current flowing through the crystal contains an oscillatory component of frequency determined by the transit of a space charge distribution between the crystal contact areas. The phenomenon occurs at ordinary temperatures, does not require an applied magnetic field and does not appear to involve a special specimen doping or geometry; it was first reported by J. B. Gunn (Solid-State Communications Volume 1, page 88, 1963) and is therefore known as the Gunn effect. The Gunn effect arises from the heating of electrons, normally in a low effective mass high mobility sub-band ($K$=0 ), by the electric field and consequent transfers into a higher effective mass lower mobility sub-band ($K$=100). This process given rise to an electron drift velocity (or current) versus applied field characteristic with a region of negative differential conductivity. For an applied bias within the negative conductance region a high field region, termed a domain, moves from cathode to anode during one cycle of current oscillation. The frequency of oscillation is determined primarily by the length of the current path through the crystal. The phenomenon has been detected in III–V semiconductors such as gallium arsenide and indium phosphide having N-type conductivity.

The term "semiconductive material exhibiting high field instability effects" is used herein to include at least any material exhibiting the Gunn effect as defined in the preceding paragraph, or exhibiting similar functional phenomena which may be based on somewhat different internal mechanisms.

The value of the applied field below which spontaneous self-oscillation does not occur can be termed the Gunn threshold value.

According to a feature of the invention a semiconductive circuit arrangement includes a body of semiconductive material exhibiting high field instability effects, means for applying between spaced contact areas on said body a potential difference producing within said body a steady electric field, and an input signal circuit modifying said electric field in response to an input signal, wherein the resistivity of the conducting cross-sectional area of said body is varied and wherein the value of said field which is normally everywhere less than the instability threshold value for said body is increased in response to an input signal to a value exceeding the instability threshold value at least locally within said body to form a high field domain within said body which propagates therealong a distance determined by the magnitude of said input signal to provide a series of output pulses, the form of said output pulses being determined by said resistivity variations throughout said body.

According to a further feature of the invention a semiconductive circuit arrangement as detailed in the preceding paragraph is provided wherein at least one other contact area is provided which is located adjacent to but insulated from a surface of said semiconductive body, said other contact area providing the means for detecting said high field domain which is formed and which is caused to propagate along said body.

The body of semiconductive material preferably consists of N-type gallium arsenide or indium phosphide; other III–V type semiconductors may be employed.

Since the operation of the arrangement is independent of the pulse repetition frequency, provided this is lower than the Gunn effect self-oscillatory frequency, the arrangement is capable of handling signals of variable frequency such as wide band frequency-modulated signals, the upper frequency limit in typical devices being of the order of $10^9$ cycles per second.

The foregoing and other features according to the invention will be understood from the following description with reference to FIGURES 1 to 11 of the accompanying drawings, in which.

Figure 1:
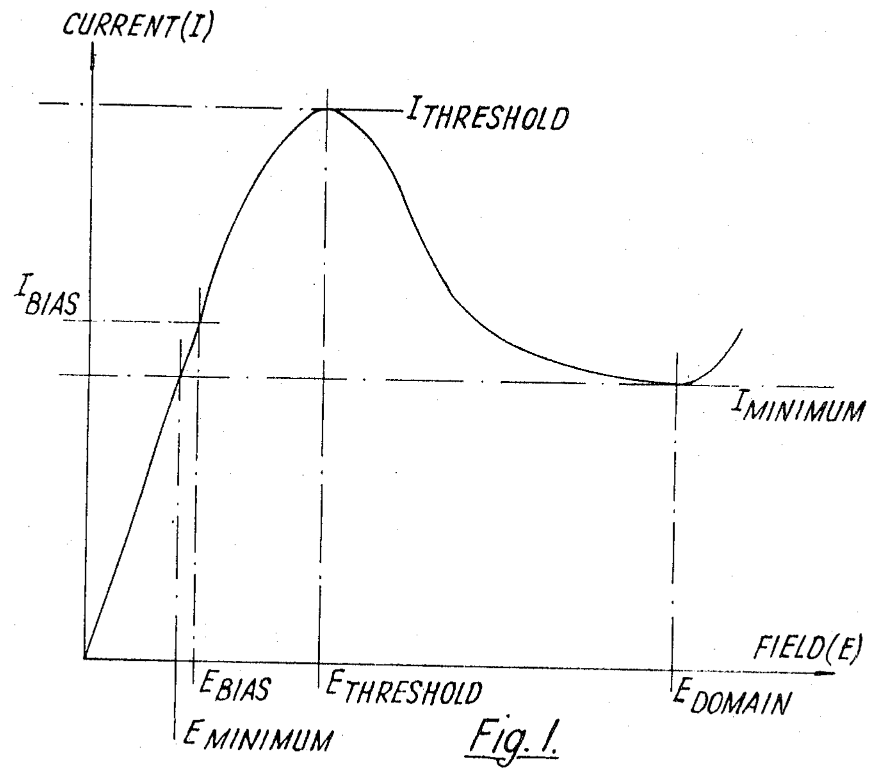
FIG. 1 shows a current (I) versus field (E) curve for the basic transfer electron mechanism according to the invention.

If a crystal of semiconductive material which exhibits the Gunn effect as defined in the preceding paragraphs has applied thereto a unidirectional field E to provide a potential difference of controllable value across the crystal with a normal steady-state value E bias and if the value of this applied field which is greater than a lower threshold field value E min. for the material is caused to exceed the threshold value E threshold at least locally within the body for a time shorter than the instability transit time between the spaced contacts (between which the unidirectional field E bias is applied) the current passed through the crystal by the unidirectional field is caused to deviate from its steady-state value thereby causing the material to be in an unstable state due to the formation of a high field instability region. This basic transferred electron mechanism is illustrated in the curve according to (FIG. 1).

In the case of gallium arsenide this lower threshold value is about 50 percent of the threshold for continuous Gunn effect oscillations. The steady field may be continuously applied or may be pulsed to reduce the total power dissipation in the device.

Figure 2:
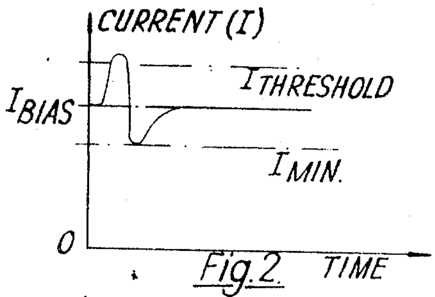
FIGS. 2 to 5 show typical waveforms produced by a device according to the invention.

If I bias is arranged to be just above I min. as shown in the curve according to FIG. 1 then the domain will break up as soon as it enters a region of lower resistivity and E bias falls below E min. This is illustrated in the waveform shown in the drawing according to FIG. 2.

Figure 4:
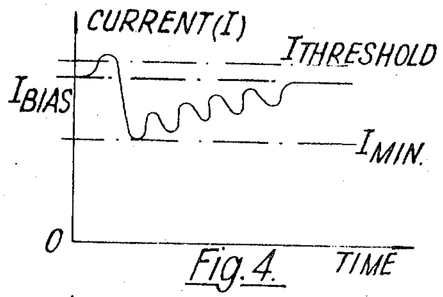
Figure 3:
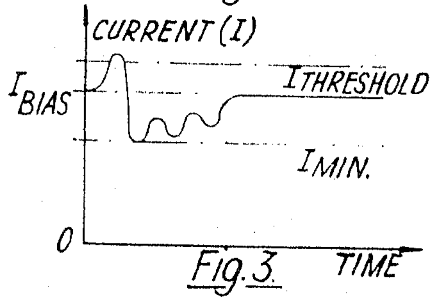
Figure 5:
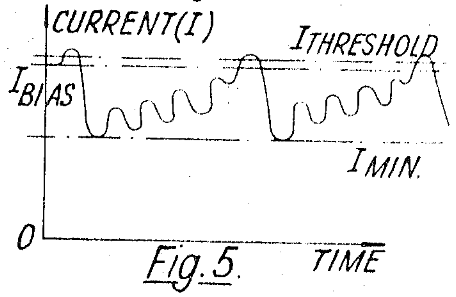

However, if I bias is such that the domain travels through several field troughs before a value below E min. is reached, then several minor pulses appear as shown in the drawing according to FIG. 3 because as the domain propagates along the crystal it is presented with an increasing resistance path. There is, of course, a minimum value to which the magnitude of the minor pulses would fall and this would be determined by the characteristics of the semiconductive material used. For slightly higher values of I bias, the resulting waveform would be as shown in the drawing according to FIG. 4.

Figure 11:
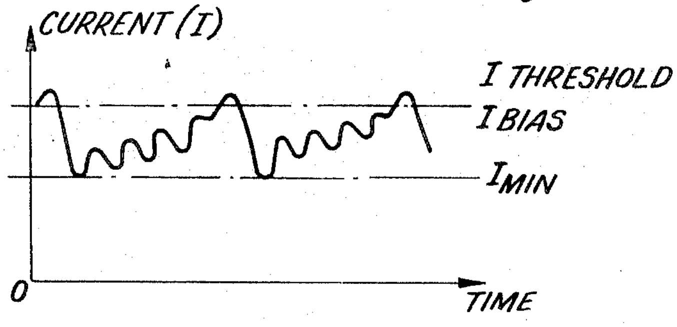
FIg. 11 shows a typical waveform produced by a device according to the invention when the potential across the device is maintained at the threshold value.

When the original current pulse due to the first high field instability region has propagated the full length of the crystal and provided the potential across the device is maintained in excess of the threshold value the semiconductive material will momentarily return to its unstable state before the sequence is repeated as shown in the drawing according to FIG. 11. Therefore by maintaining the potential across the crystal above the threshold value a continuous process will result to provide a continuous train of output pulses.

Figure 6:
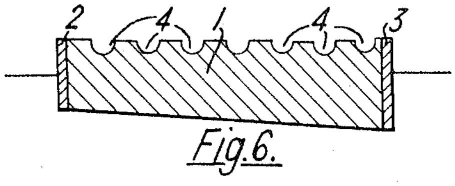
FIG. 6 shows diagrammatically a solid-state coder which is produced by modulating the conducting cross-sectional area of the bulk.

If the impedance of the crystal of semiconductive material is decreased along the length of the crystal from contact 2 to contact 3, as shown in FIG. 6 for example, then the domain or high field instability region would travel a distance which is determined by the applied bias and the point at which the field drops below E min. Thus by using this technique it is possible to produce solid-state coder units which could be adapted for use in, for example, analogue to digital conversion applications.

Referring to FIG. 6, a solid-state coder unit is shown diagrammatically and consists of a wedge-shaped crystal 1 of semiconductive material with the necessary electrical properties, for example N-type gallium arsenide having ohmic contact areas 2 and 3 secured to its plane faces.

The strips or grooves 4 are etched or air abraded into one longitudinal face of the crystal 1 to form sections of varying conductivity along the length of the crystal 1.

In practice, the crystal 1 may be formed on a semiinsulating substrate, for example gallium arsenide by epitaxial growth or alternatively a solid piece of semiconductive material could be used. The contact areas 2 and 3, for example, tin, are formed on the end faces of the crystal 1, for example, by vacuum evaporation. The device is then heat-treated, in a reducing atmosphere containing a fluxing agent, to alloy the metal semiconductor joint and form an ohmic junction.

A unidirectional current source is used to apply a potential difference of control value between the contact areas 2 and 3, and an output circuit (not shown in the drawing) is used to extract any oscillatory component of the current flowing in the crystal 1.

The phenomenon known as Gunn effect manifests itself by the appearance in the output circuit of an oscillatory component of current through the crystal 1 due the potential difference applied across the crystal 1 is caused to exceed a critical value. In the arrangement shown in FIG. 6, when the potential applied between the contact areas 2 and 3 causes the threshold value of the material at the first of the grooves 4 to be exceeded a high field instability region is formed, and the current passing through this region is caused to undergo a single excursion from its steady-state value due to the formation of this high field instability region. This high field which manifests itself in the output circuit in the form of a current pulse, will then propagate along the crystal 1, the distance travelled being determined by the applied bias and the point at which the field drops below E min. and during the propagation the high field on encountering the remaining grooves 4, again causes the current to undergo single excursions from its normal steady-state value at each of the remaining grooves 4; because of the variation in the cross-sectional area of the device the magnitude of this series of pulses is less than the pulse due to the first high field instability region because of the increased resistance which is presented to the electric field but there is, of course, a minimum value to which the magnitude of these pulses would fall and this will be determined as previously stated by the material.

Thus it can be seen from the above that when a variable analog input signal is applied to the solid-state coder unit shown in the drawing according to FIG. 6 a distinctive digital output pattern is obtained i.e. a train of uniform pulses which may be counted.

Figure 7:
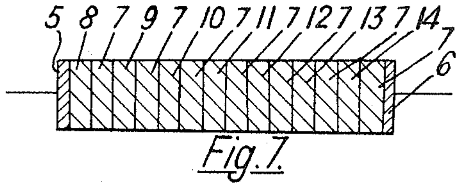
FIG. 7 shows diagrammatically a solid-state coder which is produced by diffusing dopants into selected areas of the device to modify its conductivity.

Referring to FIG. 7, a solid-state coder unit is shown diagrammatically. This is an alternative form of the arrangement shown in the drawing according to FIG. 6. The construction of this device is as detailed for the unit shown in the drawing according to FIG. 6 except the crystal 1 is a parallel-sided disc and the conductivity of the material is varied by doping the crystal 1 with a suitable dopant to produce regions of varying resistivity.

The regions 7 are of the same resistivity but the regions 8 to 14 are arranged such that the resistivity of each successive region is progressively increased thereby simulating the conditions obtained in the coder unit shown in the drawing shown in FIG. 6.

The operation of this device is exactly the same as detailed for the coder unit shown in the drawing according to FIG. 6.

Figure 8:
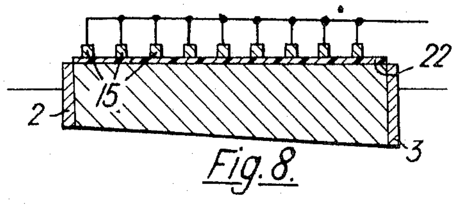
FIG. 8 shows diagrammatically an alternative solid-state coder in which the domain voltage is sensed by one or more electrodes along the device.

Referring to FIG. 8 a solid-state coder unit in which the domain or high field instability region is sensed by one or more electrodes along the device is shown diagrammatically. The construction of this device is exactly as detailed for the unit shown in the drawing according to FIG. 6 except the grooves 4 are omitted and the output circuit is changed. A further series of contact areas 15 are deposited on one of the side faces of the semiconductor crystal 1 and electrically insulated from it by a thin layer of insulating material 22 such as silica. The multiple electrodes are thus situated near the high field instability region in the device and as the high field which as previously stated manifests itself in the form of sharp current pulses in the output circuit, propagates along the device, it is sensed by each of the contact areas 15 in turn and capacitively coupled to the output by way of the layer 22 to produce a series of output pulses. Again, the distance travelled by the high field instability region being determined by the applied bias and the point at which the field drops below E min. By suitable arrangement of the contact areas 15 the device could be arranged to have a variety of codes built into the output pulse to any specific requirements.

Figure 9:
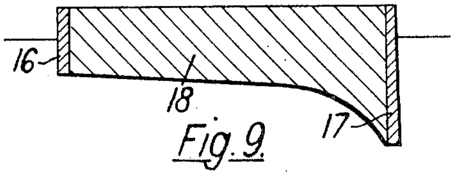
FIGS. 9 and 10 show diagrammatically further alternative arrangements for solid-state coder units.
Figure 10:
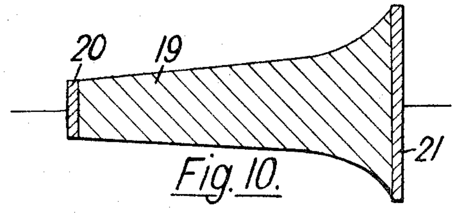

FIGS. 9 and 10 show diagrammatically further arrangements for solid-state coder units. The crystals 18 and 19 which are of semiconductive material have one or both of their longitudinal faces profiled according to a desired law, for example, a logarithmic law, thereby giving complex impedance variations along the crystal to provide complex outputs from the code units to satisfy the specific conditions required.

The coder units shown in the drawings according to FIGS. 6 to 10 could, of course, be combined in any combination to provide still further alternative arrangements whereby the impedance gradient along the crystal could be varied to provide a variety of codes to suit specific applications.

It is to be understood that the foregoing description of specific examples of this invention is made by way of example only and is not to be considered as a limitation on its scope.

What we claim is:

1. A solid-state device comprising a specimen of semiconductor material having the innate property of being responsive to electric fields in excess of a critical intensity to nucleate a high electric field region and responsive to electric fields in excess of a sustaining intensity less than said critical intensity to propagate a high electric field region, and electric field applying means including voltage means connected to first and second ohmic contacts attached to said specimen for establishing an electric field gradient within said specimen intermediate said ohmic contacts, said voltage means being capable of establishing the electric field intensity in said specimen adjacent one of said ohmic contacts in excess of said critical intensity so as to nucleate a high electric field region and of establishing the electric field intensity in said specimen adjacent the other of said ohmic contacts below said sustaining intensity while a high electric field region is propagating in said specimen, said voltage means being variable so as to control the propagation distance of said high field region along said specimen.

2. A solid-state device according to claim 1, wherein said specimen has a transverse resistivity which varies monotonically with distance from said first contact.

3. A solid-state device according to claim 2 wherein said specimen is wedge-shaped to provide said monotonic resistivity variation.

4. A solid-state device according to claim 2, wherein said specimen is profiled in accordance with a logarithmic law.

5. A solid-state device according to claim 1, wherein said specimen has a transverse resistivity which is varied by selectively diffusing a particular dopant into said body to produce regions of varying conductivity.

6. A solid-state device according to claim 1, wherein said device includes at least one additional contact area adjacent to and insulated from a given surface of said specimen for detecting said high field domain as it propagates through said specimen.

7. A solid-state device comprising a specimen of semiconductor material of given conductivity type having a graded impurity profile extending between opposite surfaces, said semiconductor material having a multivalley conduction band and having the innate property of being responsive to electric fields in excess of a sustaining intensity less than said critical intensity to sustain and propagate a high electric field region along said specimen, and voltage means including ohmic contacts attached to said opposite surfaces of said specimen for establishing an electric field gradient within said specimen and between said ohmic contacts, said voltage means being of sufficient magnitude to nucleate and propagate successively high electric field regions along at least a portion of said specimen whereby current flow along said specimen fluctuates periodically in the form of coherent oscillations, said voltage means being variable so as to control the propagation distance of said high electric field regions along said specimen whereby the frequency of said coherent oscillations is varied.

* * * * *